US008929730B2

(12) United States Patent
Skoog et al.

(10) Patent No.: US 8,929,730 B2
(45) Date of Patent: *Jan. 6, 2015

(54) DIFFERENTIAL EYE DIAGRAMS

(75) Inventors: Ronald A. Skoog, Bend, OR (US);
Marcus Pang, Manalapan, NJ (US);
Paul Toliver, Tinton Falls, NJ (US)

(73) Assignee: Telcordia Technologies, Inc.,
Piscataway, NJ (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/617,078

(22) Filed: Sep. 14, 2012

(65) Prior Publication Data

US 2013/0011133 A1    Jan. 10, 2013

Related U.S. Application Data

(63) Continuation of application No. 12/633,139, filed on Dec. 8, 2009, now Pat. No. 8,364,033.

(51) Int. Cl.
*H04B 10/08* (2006.01)
*H04B 10/079* (2013.01)

(52) U.S. Cl.
CPC .................................. *H04B 10/0795* (2013.01)
USPC ................... 398/25; 398/26; 398/27; 398/29; 398/177

(58) Field of Classification Search
USPC ......... 398/147, 154, 158, 159, 25–29, 33–35, 398/177, 199; 375/224–227; 714/715
See application file for complete search history.

(56) References Cited

U.S. PATENT DOCUMENTS

| 5,774,242 | A   * | 6/1998  | O'Sullivan et al. ............. 398/29  |
| 6,548,804 | B1    | 4/2003  | Yuhara et al.                            |
| 6,760,676 | B2  * | 7/2004  | Nygaard, Jr. .................... 702/79  |
| 6,784,653 | B2  * | 8/2004  | Baumert .................... 324/76.28    |
| 6,934,647 | B2  * | 8/2005  | MacDonald .................... 702/66     |
| 6,961,520 | B2  * | 11/2005 | Grau et al. ..................... 398/33  |
| 7,035,361 | B2  * | 4/2006  | Kim et al. ..................... 375/350  |
| 7,362,977 | B2  * | 4/2008  | Moeller ......................... 398/147 |
| 7,376,352 | B2  * | 5/2008  | Tayebati et al. ............... 398/147   |
| 7,693,681 | B2  * | 4/2010  | Yamada ....................... 702/152    |
| 7,969,561 | B2  * | 6/2011  | Yang et al. ................... 356/73.1  |
| 8,407,511 | B2  * | 3/2013  | Mobin et al. .................. 713/500   |
| 8,635,986 | B2  * | 1/2014  | Ikeda et al. .................... 123/403 |
| 8,706,435 | B2  * | 4/2014  | Engholm et al. ................. 702/77   |
| 2002/0060820 | A1 * | 5/2002 | Buchali ......................... 359/109 |
| 2003/0115028 | A1 * | 6/2003 | Summerfield et al. ........... 703/6      |
| 2008/0260394 | A1 * | 10/2008 | Ereifej ......................... 398/159 |
| 2010/0135654 | A1 * | 6/2010 | Pincemin et al. ............... 398/25    |
| 2010/0303473 | A1 * | 12/2010 | Alfiad et al. .................. 398/202  |

(Continued)

OTHER PUBLICATIONS

D.C. Kilper, et al., "Optical Performance Monitoring," JLT, vol. 22, No. 1, p. 294-304, Jan. 2004.

(Continued)

*Primary Examiner* — Daniel Washburn
*Assistant Examiner* — Hibret Woldekidan

(57) ABSTRACT

Changes in a signal are detected. The signal is repeatedly sampled in a synchronous manner during a predetermined interval to generate a captured eye diagram. At least one of a positive differential eye diagram or a negative differential eye diagram is generated from the captured eye diagram and a baseline eye diagram. The at least one positive or negative differential eye diagram is analyzed to determine whether a change in signal conditions is present.

5 Claims, 8 Drawing Sheets

(56) References Cited

U.S. PATENT DOCUMENTS

2010/0329318 A1* 12/2010 Dai et al. .................. 375/224
2010/0329319 A1* 12/2010 Dai et al. .................. 375/224
2012/0082465 A1* 4/2012 Akiyama et al. ............. 398/158

OTHER PUBLICATIONS

L. Meflah, et al., "Advanced Optical Performance Monitoring for Dynamically Reconfigurable Networks," 10 European Conf. on Networks & Optical Communications, Univ. College London, Jul. 5-7, 2005.

I. Shake, et al., "Simple Measurement of Eye Diagram and BER Using High-Speed Asynchronous Sampling," JLT, vol. 22, No. 5, pp. 1296-1302, May 2004.

I. Shake, H. Takara, "Chromatic Dispersion Dependence of Asynchronous Amplitude Histogram Evaluation of NRZ Signal,"JLT, vol. 21, pp. 2154-2161, Oct. 2003.

* cited by examiner

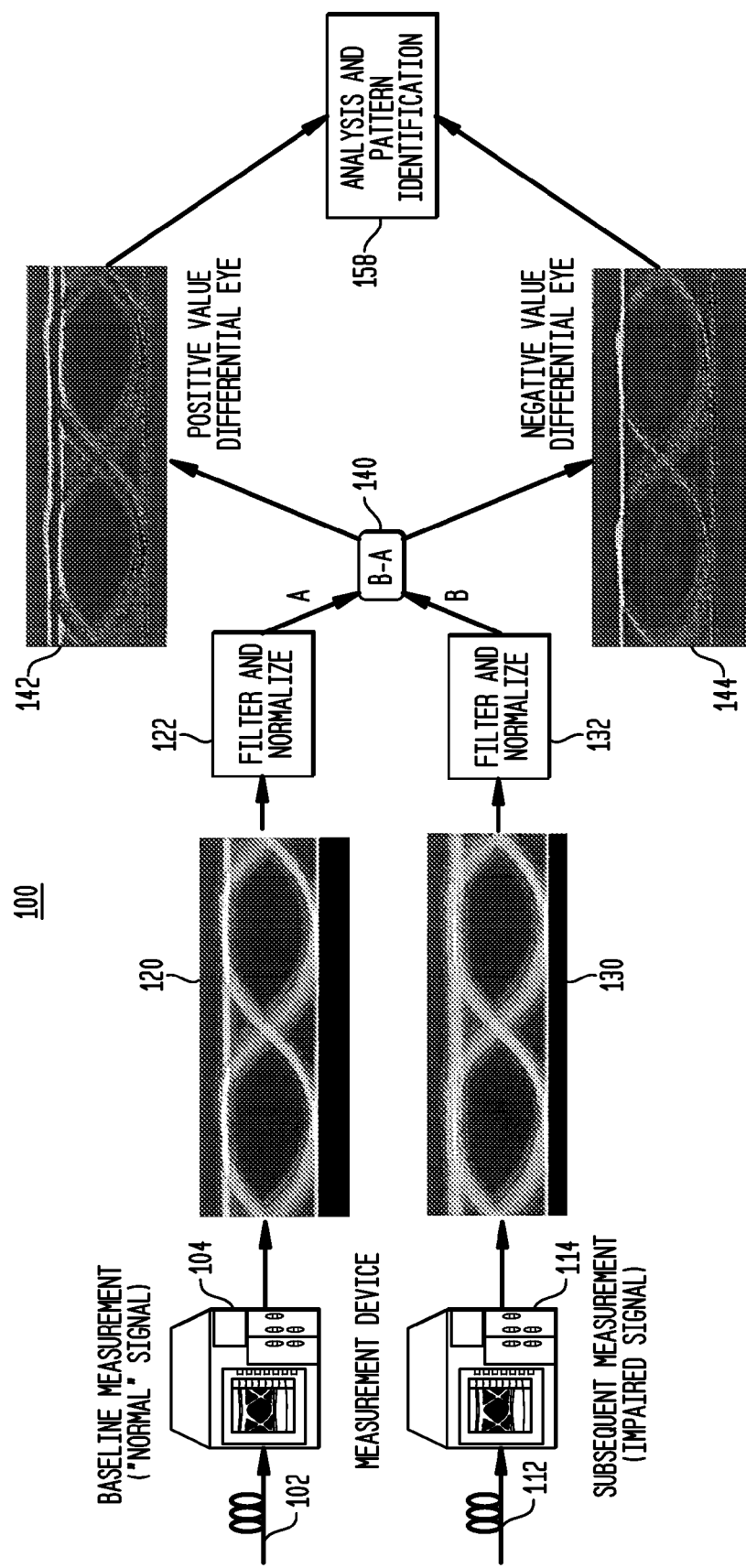

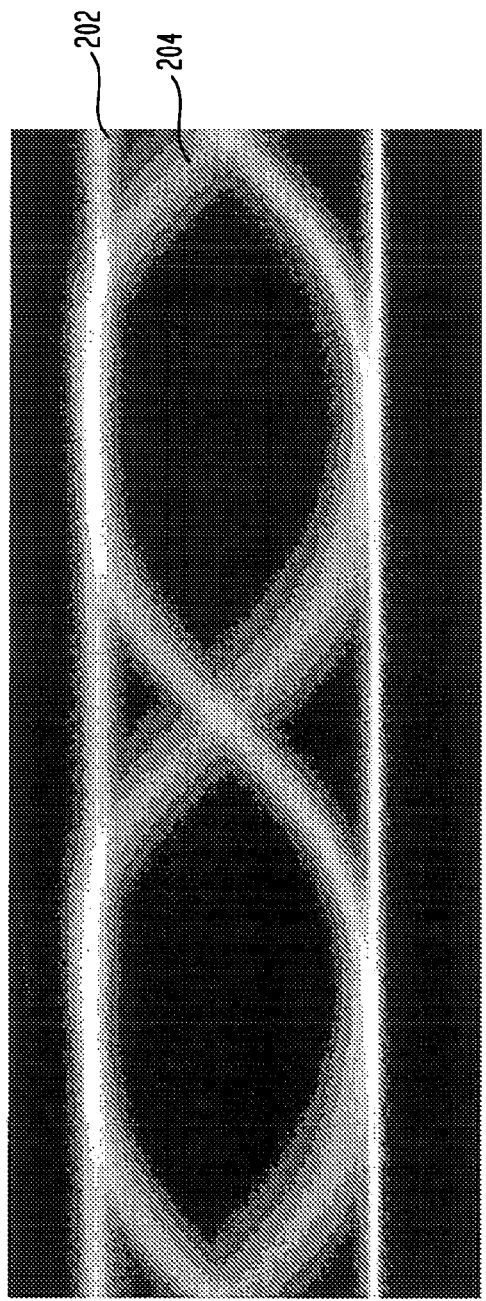
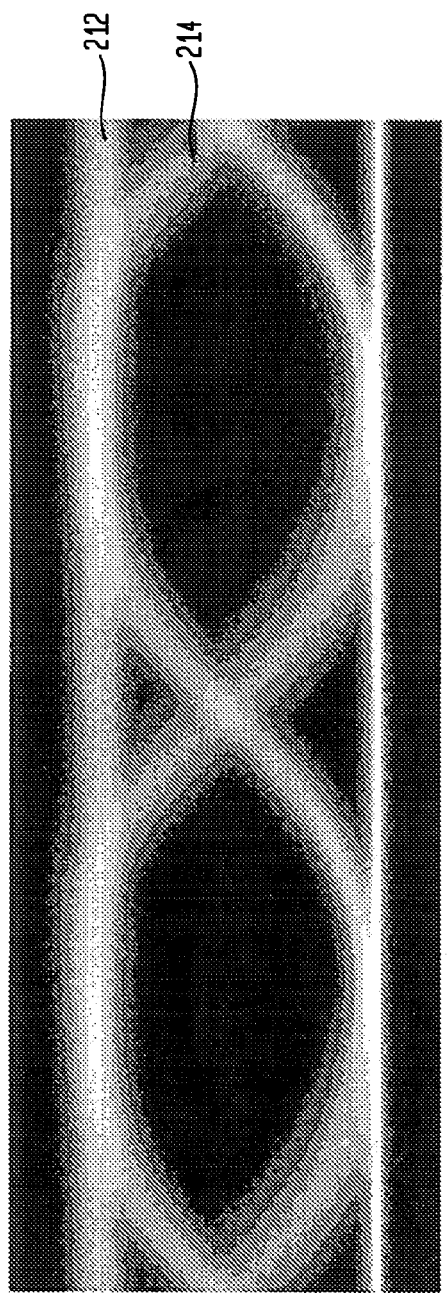

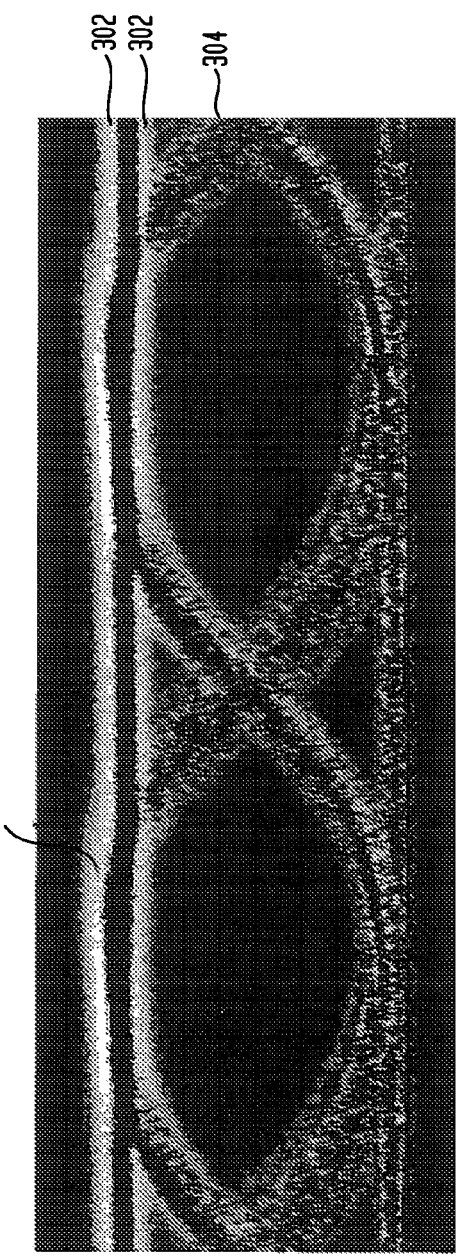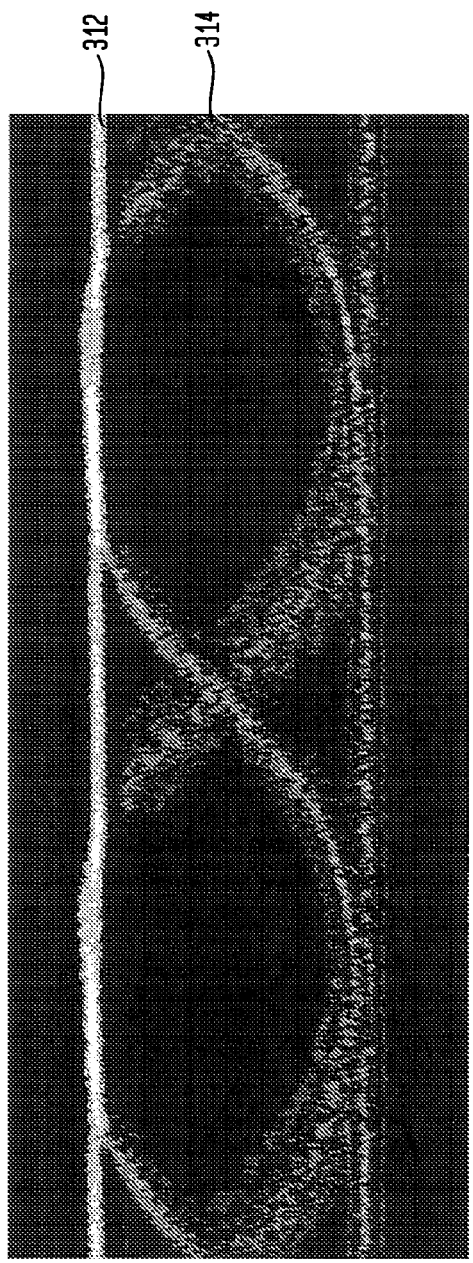

ADDED POLARIZATION MODE
DISPERSION (PMD)

ADDED CHROMATIC DISPERSION (CD)

ADDED CROSS-TALK

DIFFERENTIAL EYE DIAGRAMS

BACKGROUND OF THE INVENTION

This application is a continuation of pending U.S. patent application Ser. No. 12/633,139, filed Dec. 8, 2009. The invention is directed to transmission systems such as optical transmission systems and, more particularly, to detecting, identifying, and/or measuring impairments present in signals carried by such transmission systems.

Presently, performance of an optical transmission system is monitored using methods that can determine the existence of an anomaly in the transmission system but which cannot identify the cause of the anomaly. Specifically, frequency domain (spectral) methods are used and monitor, for example, optical channel power, total dense wavelength division multiplexing (DWDM) signal optical power, optical signal-to-noise ratio (OSNR), and/or optical channel wavelength. The known spectral methods, however, are merely averaging methods and cannot sense a pulse or its duration, and thus the known spectral methods are insensitive to effects caused by such pulse distortions.

The known spectral methods, therefore, are best suited for static point-to-point wavelength division multiplexing (WDM) systems. Dynamic WDM (DWDM) systems, by contrast, frequently change the light path connections that are used to convey the optical signals. Each time the light path connections are changed, the performance of the DWDM system can change. Because the known spectral methods are averaging methods, these methods are unsuitable for monitoring a dynamic WDM system.

Other, more sophisticated monitoring techniques that measure time domain signal properties, such as analysis of captured eye diagrams, Q-factor analysis, etc., are capable of detecting pulse distortions. Such techniques, however, are carried out using expensive test equipment, such as sampling oscilloscopes or Q-factor meters, and hence are not cost effective.

Still other experimental monitoring techniques have focused on measuring the error performance, such as the bit error rate (BER), as detected at a receiver. Such techniques, for example, carry out sampling at an optimal point in an eye diagram to get a good quality estimate of the bit error rate. These techniques, however, have only a limited ability to identify a type of impairment that is causing a change in the optical transmission systems performance. That is, such techniques have only a limited ability to detect impairments such as chromatic dispersion, polarization mode dispersion, crosstalk, etc.

It is therefore desirable to provide performance monitoring that can identify abrupt fault conditions in the optical transmission system and the causes of such abrupt fault conditions. It is also desirable to provide performance monitoring that can identify any small changes or trends in the conditions of the optical transmission system and thus detect the precursors of a fault condition. It is further desirable to provide performance monitoring that can identify the cause of such small changes or trends, thereby allowing remedial action to be taken before the fault condition materializes.

SUMMARY OF THE INVENTION

According to an aspect of the invention, changes in a signal are detected. The signal is repeatedly sampled in a synchronous manner during a predetermined interval to generate a captured eye diagram. At least one of a positive differential eye diagram or a negative differential eye diagram is generated from the captured eye diagram and a baseline eye diagram. The at least one positive or negative differential eye diagram is analyzed to determine whether a change in signal conditions is present.

In accordance with this aspect of the invention, the sampled signal may be an intensity modulated digital optical signal, or the sampled signal may be a phase modulated digital optical signal. The signal may be repeatedly sampled in a synchronous manner during a prior interval that is earlier than the predetermined interval to obtain the baseline eye diagram. The baseline eye diagram may be generated by simulation. At least one of the captured eye diagram or the baseline eye diagram may be filtered and smoothed prior to the generating of the at least one positive or negative differential eye diagram. At least one of the captured eye diagram or the baseline eye diagram may be normalized, prior to the generating of the at least one positive or negative differential eye diagram, such that the captured eye diagram and the baseline eye diagram have a same number of samples.

The at least one positive or negative differential eye diagram may be compared to another differential eye diagram associated with a particular signal impairment to detect whether the particular signal impairment is present in the sampled signal. The particular signal impairment may be one or more of chromatic dispersion (CD), polarization mode dispersion (PMD), coherent crosstalk, non-linear effects, or other signal impairment types that occur in an optical transmission system. The differential eye diagram associated with the particular signal impairment may be generated using a simulation of the particular signal impairment. The positive value differential eye diagram may be compared to the negative value differential eye diagram to detect a change in the power level of coherent cross-talk in the sampled signal.

The baseline eye diagram may be associated with presence of a first signal impairment, and the at least one positive or negative differential eye diagram may be compared to another differential eye diagram associated with a further signal impairment to detect whether the further signal impairment is present in the sampled signal. The first particular signal impairment may be one or more of chromatic dispersion (CD), polarization mode dispersion (PMD), coherent crosstalk, non-linear effects, or other signal impairment types that occur in an optical transmission system. The further particular signal impairment may be one or more of chromatic dispersion (CD), polarization mode dispersion (PMD), coherent crosstalk, non-linear effects, or other signal impairment types that occur in an optical transmission system.

According to another aspect of the invention, impairments in a digital optical transmission system are detected. A digital optical signal carried by the digital optical transmission system is repeatedly sampled, in a synchronous manner during a predetermined interval, to generate a captured eye diagram. At least one of a positive differential eye diagram or a negative differential eye diagram is generated from the captured eye diagram and a baseline eye diagram. The at least one positive or negative differential eye diagram is analyzed to determine whether a change in signal conditions is present.

In accordance with this aspect of the invention, the digital optical signal carried by the digital optical transmission system may be repeatedly sampled in a synchronous manner during a prior interval that is earlier than the predetermined interval to obtain the baseline eye diagram. The baseline eye diagram may be generated by simulation. At least one of the captured eye diagram or the baseline eye diagram may be filtered and smoothed prior to the generating of the at least one positive or negative differential eye diagram. At least one of the captured eye diagram or the baseline eye diagram may be normalized, prior to the generating of the at least one positive or negative differential eye diagram, such that the captured eye diagram and the baseline eye diagram have a same number of samples.

The at least one positive or negative differential eye diagram may be compared to another differential eye diagram associated with a particular signal impairment to detect whether the particular signal impairment is present in the sampled signal. The particular impairment may be one or more of chromatic dispersion (CD), polarization mode dispersion (PMD), coherent crosstalk, non-linear effects, or other signal impairment types that occur in an optical transmission system. The positive value differential eye diagram may be compared to the negative value differential eye diagram to detect a change in power level of coherent cross-talk in the sampled signal.

The baseline eye diagram may be associated with presence of a first signal impairment, and the at least one positive or negative differential eye diagram may be compared to another differential eye diagram associated with a further signal impairment to detect whether the further signal impairment is present in the sampled signal. The first impairment may be one or more of chromatic dispersion (CD), polarization mode dispersion (PMD), coherent crosstalk, non-linear effects, or other signal impairment types that occur in an optical transmission system. The further impairment may be one or more of chromatic dispersion (CD), polarization mode dispersion (PMD), coherent crosstalk, non-linear effects, or other signal impairment types that occur in an optical transmission system.

The digital optical signal may be repeatedly sampled during a subsequent predetermined interval to generate a further captured eye diagram, at least one of a further positive differential eye diagram or a further negative differential eye diagram may be generated from the further eye diagram and the baseline eye diagram, and the at least one further positive or negative differential eye diagram may be analyzed to determine whether a further change in signal conditions is present.

The foregoing aspects, features and advantages of the present invention will be further appreciated when considered with reference to the following detailed description and accompanying drawings.

BRIEF DESCRIPTION OF THE DRAWINGS

FIG. 1 is a block diagram illustrating an embodiment of the invention.

FIG. 2A shows in greater detail the baseline signal eye diagram shown in FIG. 1.

FIG. 2B shows in greater detail the captured signal eye diagram of FIG. 1.

FIG. 3A shows in greater detail the positive value differential eye diagram of FIG. 1.

FIG. 3B shows in greater detail the negative value differential eye diagram of FIG. 1.

DETAILED DESCRIPTION

Figure 4A:
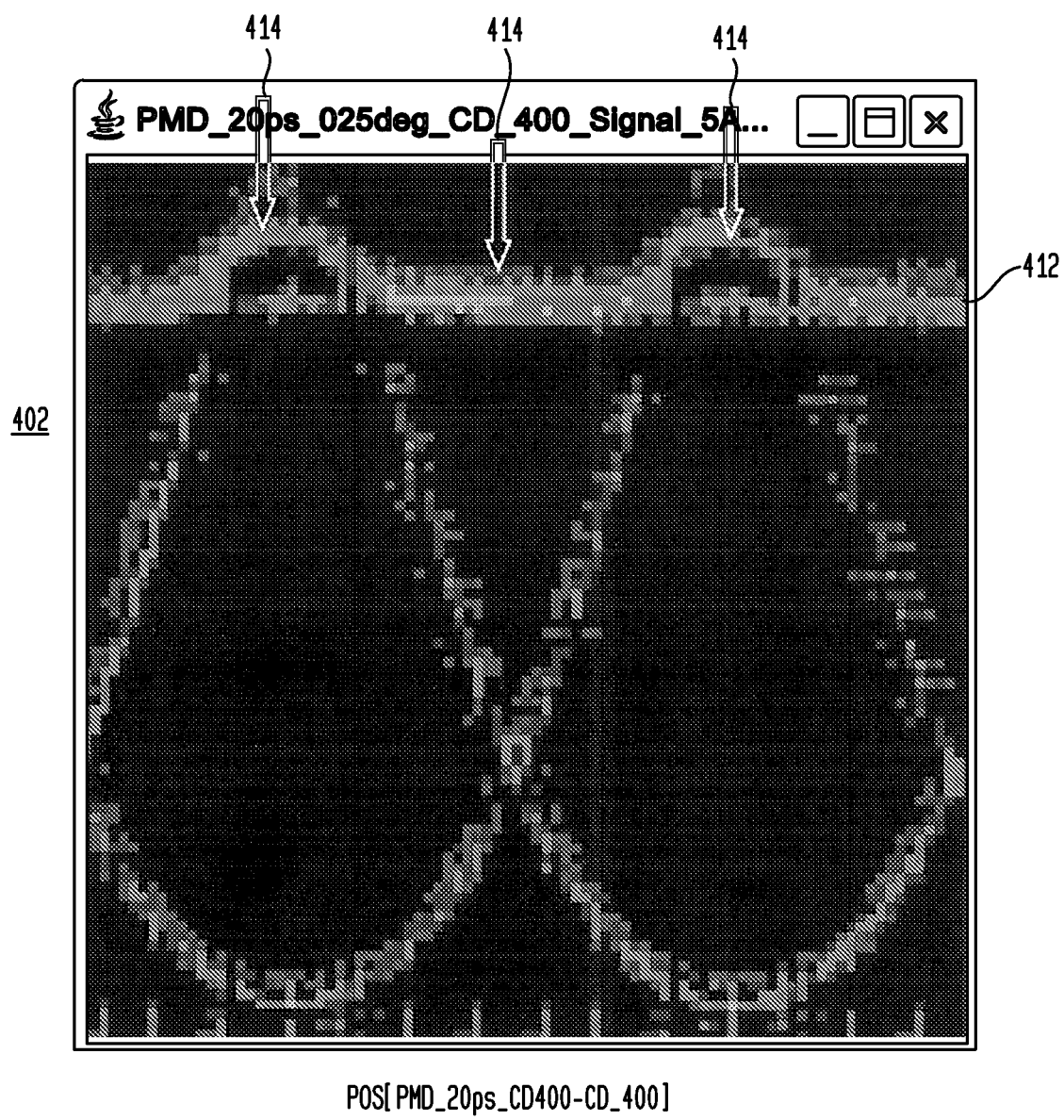
FIG. 4A shows a positive value differential eye diagram for an optical transmission system in which chromatic dispersion (CD) and polarization mode dispersion (PMD) are present.

FIG. 1 illustrates an embodiment 100 of the present invention. A baseline signal 102, that is, an intensity modulated or phase modulated digital optical signal that is transmitted over an optical transmission system when the system is operating within "normal" impairments and when the bit error rate of the system is within its design tolerance, is delivered to a measurement device 104, such as an oscilloscope. The measurement device repeatedly samples the baseline signal in a synchronous manner to generate an eye pattern, also known as an eye diagram 120, which is shown on the display of the measurement device. Such eye diagrams may be generated by repetitively sampling the power of the digital data signal and then applying the sampled values to vertical input while the data rate is used to trigger the horizontal sweep. The resulting pattern is known as an eye diagram because it resembles a pair of eyes located between a pair of rails.

FIG. 2A illustrates in greater detail the eye diagram generated from measurements of the baseline signal. The eye diagram is an M pixels×N pixels diagram, such as 100 pixels× 250 pixels. The value of each pixel of the eye diagram represents the number of times that a sample having a power associated with the vertical position of that pixel was detected at a time associated with the horizontal position of that pixel. Thus, the eye diagram is the equivalent of a two-dimensional histogram of the number of samples detected at each combination of power level and time.

Alternatively, the baseline eye diagram is generated by computer simulation rather than from a sampled digital optical signal.

At a time after the eye diagram of the baseline signal is generated, digital optical signal 112 carried by the optical transmission system is sampled by measurement device 114 in a manner similar to that in which the baseline signal was sampled so that another eye diagram 130 is generated. FIG. 2B shows the eye diagram 130 in greater detail.

Then, filtering and smoothing 112 of the baseline eye diagram 120 and filtering and smoothing 132 of the subsequently captured eye diagram 130 are carried out to minimize the effects of randomly generated noise in the signals. Such filtering and smoothing may be carried out using known digital filtering techniques. Then, the pixel values in one or both of the filtered and smoothed eye diagrams are normalized so that an equal number of samples is present in each eye diagram. The normalization of the pixel values allows for numerical comparison of the two eye diagrams.

Next, for each pixel in the baseline eye diagram 120, the value represented by that pixel is subtracted from the value represented its corresponding pixel in the subsequently captured eye diagram 130. The results of these subtractions 140 are shown as two differential eye diagrams. A positive value differential eye diagram 142 is generated from the pixels having positive difference values. Namely, the positive value differential eye diagram is generated from the pixel locations in which the value represented at that location in the baseline eye diagram 120 is less than the value represented at the corresponding location in the subsequently captured eye diagram 130. A negative value differential eye diagram 144 is generated from the pixels having negative pixel values. That is, the positive value differential eye diagram is generated from the pixel locations in which the value represented at that location in the baseline eye diagram is greater than the value represented at the corresponding location in the subsequently captured eye diagram. FIGS. 3A and 3B respectively show the positive value differential eye diagram 142 and the negative value differential eye diagram 144 of FIG. 1 in greater detail.

When the baseline eye diagram is generated from actual samples of the optical data signal, the positive and negative value differential eye diagrams illustrate the change in the optical data signal between the time that the baseline signal was sampled and the time that the optical data signal was subsequently sampled. Moreover, as shown in FIG. 3A, the positive value differential eye diagram 142 shows the regions to which the eye diagram has spread. That is, the positive value differential eye diagram 142 shows the pixels that are part of the subsequently captured eye diagram 130 but which are not part of the baseline eye diagram 120. As an example, bright lines 302 in the upper rail of the positive value differential eye diagram 142 show which pixels of the top rail 212 of the subsequently captured eye diagram 130, shown in FIG. 2B, were not part of the top rail 202 of the baseline eye diagram 120, shown in FIG. 2A. As another example, region 304 in FIG. 3A shows which pixels of the region 214 of the subsequently captured eye diagram that were not part of the region 204 of the baseline eye diagram.

By contrast, the negative value differential eye diagram 144, shown in FIG. 3B, shows the regions from which the eye diagram has spread. Namely, the negative value differential eye diagram 144 shows the pixels that are part of the baseline eye diagram 120 but which are not part of the subsequently captured eye diagram 130. As an example, bright line 312 of the negative value differential eye diagram 144 shows the pixels in the top rail 202 of the baseline eye diagram that are no longer present in the top rail 212 of the subsequently captured eye diagram.

By analyzing the positive and negative value differential eye diagrams, impairments in the subsequently sampled digital optical signal and related quantitative information can be determined. Such impairments include, but are not limited to, the presence of chromatic dispersion (CD), polarization mode dispersion (PMD), non-linear effects such as four-wave mixing, and/or coherent cross-talk (XTalk). The patterns of the positive and negative value differential eye diagrams are compared to the patterns of characteristic differential eye diagrams that are representative of these impairments to determine whether the impairment is present and, if present, to quantify the impairment.

The characteristic differential eye diagrams of each impairment may be produced from eye diagrams generated using a simulation and/or actual measurements of the digital optical signals of the optical transmission system. As an example, a baseline eye diagram may be generated from a simulation or by monitoring the optical transmission system as described previously. Another eye diagram showing the effects of one or more impairments is generated from a simulation or from actual measurements of the digital optical signals at a time when that impairment is present. Positive and negative value differential eye diagrams are then produced by subtracting the baseline eye diagram from the eye diagram showing the effects of the impairment. The positive and negative differential eye diagrams then serve as the characteristic differential eye diagrams of that impairment.

FIG. 4A depicts an example of a characteristic positive differential eye diagram 402 showing the effects of polarization mode dispersion. The characteristic positive differential eye diagram is generated from a baseline eye diagram representing a digital optical signal in which chromatic dispersion is present and a further eye diagram representing a digital optical signal in which both chromatic dispersion and polarization mode dispersion are present. That is, the baseline signal eye diagram is subtracted from the further eye diagram. The effect of the polarization mode dispersion is shown at the bright regions of the top rail 412 as identified by arrows 414.

Figure 4B:
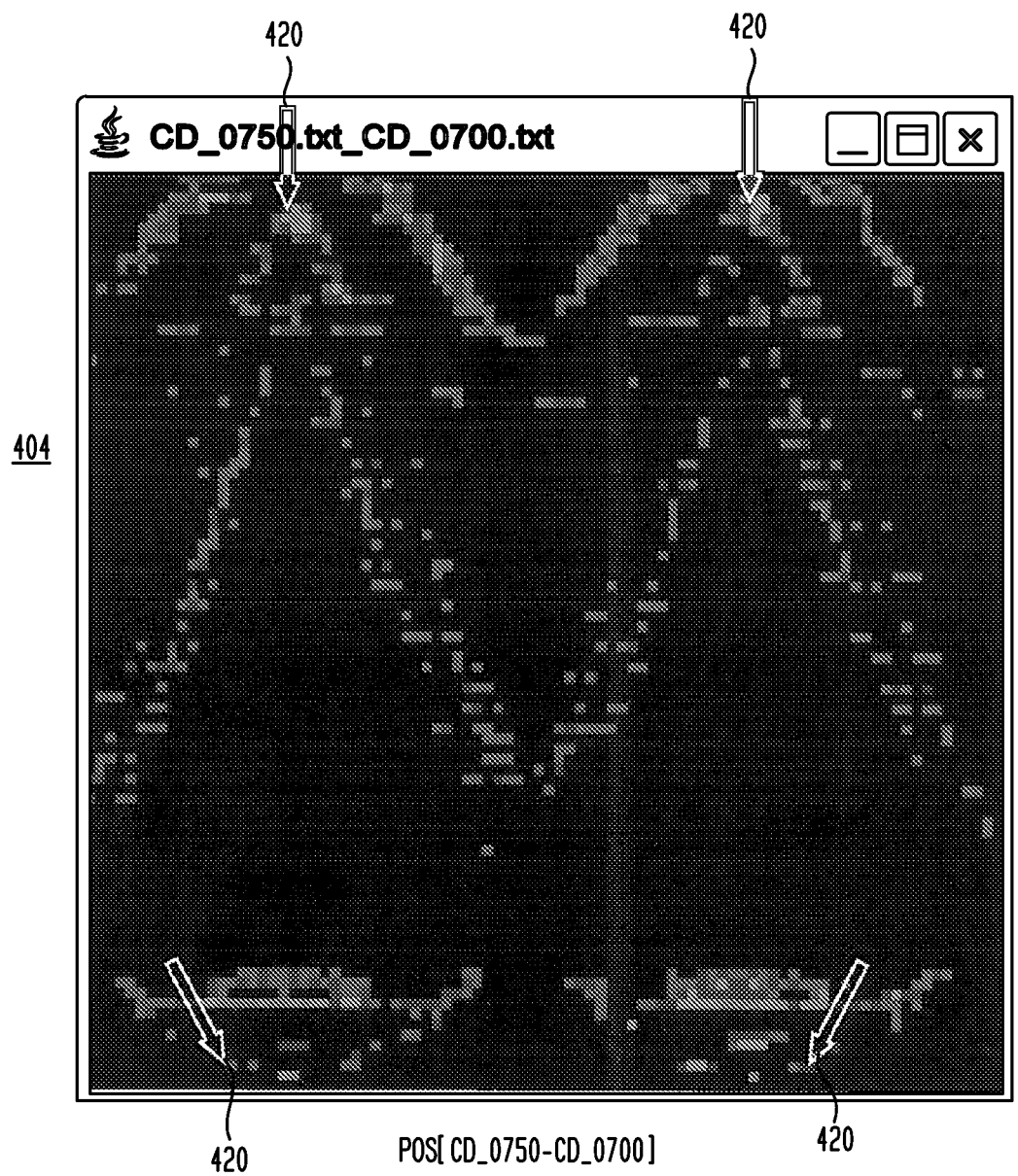
FIG. 4B shows a positive value differential eye diagram for an optical transmission system in which an increase in chromatic dispersion (CD) occurs.

FIG. 4B depicts a characteristic positive value differential eye diagram 404 showing the additive effects of chromatic dispersion. The characteristic positive value differential eye diagram is generated by subtracting a baseline eye diagram representing a digital optical signal in which chromatic dispersion is present from a further eye diagram representing a digital optical signal in which additional chromatic dispersion is present. Bright regions in the top and bottom rails of the characteristic positive value differential eye diagram, which are identified by arrows 420, illustrate the effects of the added chromatic dispersion.

Figure 4C:
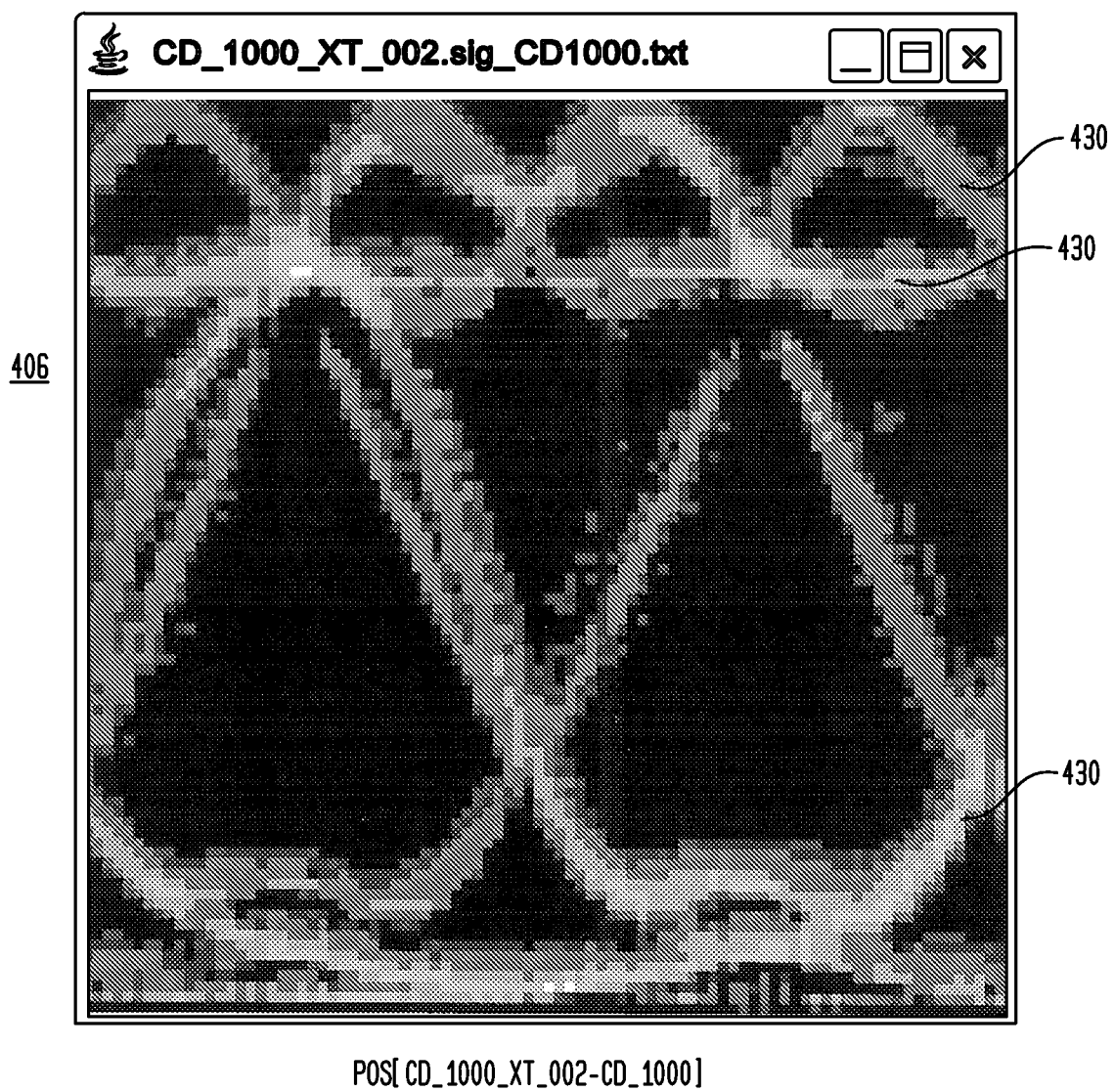
FIG. 4C shows a positive value differential eye diagram for an optical transmission system in which chromatic dispersion (CD) and cross-talk are present.

FIG. 4C illustrates a characteristic positive value differential eye diagram 406 showing the effects of coherent cross-talk. The characteristic positive value differential eye diagram is generated by subtracting a baseline eye diagram representing a digital optical signal in which chromatic dispersion is present from a further eye diagram representing a digital optical signal in which the coherent cross-talk is present. Bright regions are present throughout the characteristic eye diagram 406.

The patterns of the positive and negative value differential eye diagrams, respectively shown in FIGS. 2A and 2B, may each be compared to the patterns of characteristic positive and negative value differential eye diagram, such as are shown in FIGS. 4A-4C, to determine whether impairments, such as polarization mode dispersion, chromatic dispersion, and/or cross-talk, are present in the captured digital optical signal.

Further, the progress of such impairments can be monitored by periodically repeating the samplings of the digital optical signal. Specifically, each time the samplings of the digital optical signal is carried out, another eye diagram is generated. Positive and negative value differential eye diagrams are then produced by subtracting a baseline eye diagram from the currently generated eye diagram. Here, however, the current baseline eye diagram may be either the eye diagram generated from the immediately preceding time that samplings of the digital optical signal were carried out, the eye diagram generated from another earlier time that samplings of the digital optical signal were carried out, or the original baseline eye diagram. The patterns of the positive negative value differential eye diagrams are each analyzed and compared to the patterns of one or more characteristic differential eye diagrams associated with the various impairments.

By repeating such comparisons, the change in a given impairment can be monitored over time. As an example, the positive and negative value differential eye diagrams generated from each repetition of the periodic samplings may be compared to the positive and negative value differential eye diagrams that are associated with polarization mode dispersion to detect changes in the polarization mode dispersion over time. As a result, small changes in an impairment can be tracked and corrective action be taken before such an impairment has a serious impact on the performance of the optical transmission system.

Figure 5A:
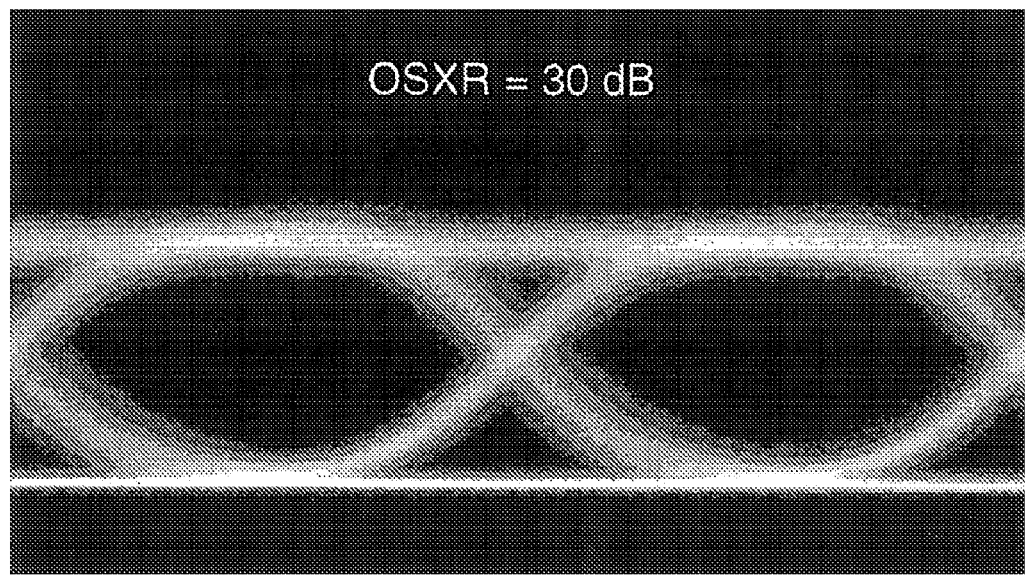
FIG. 5A shows a baseline signal eye diagram for a digital optical signal in which cross-talk is present at a power level 30 dB lower than a desired power level.
Figure 5B:
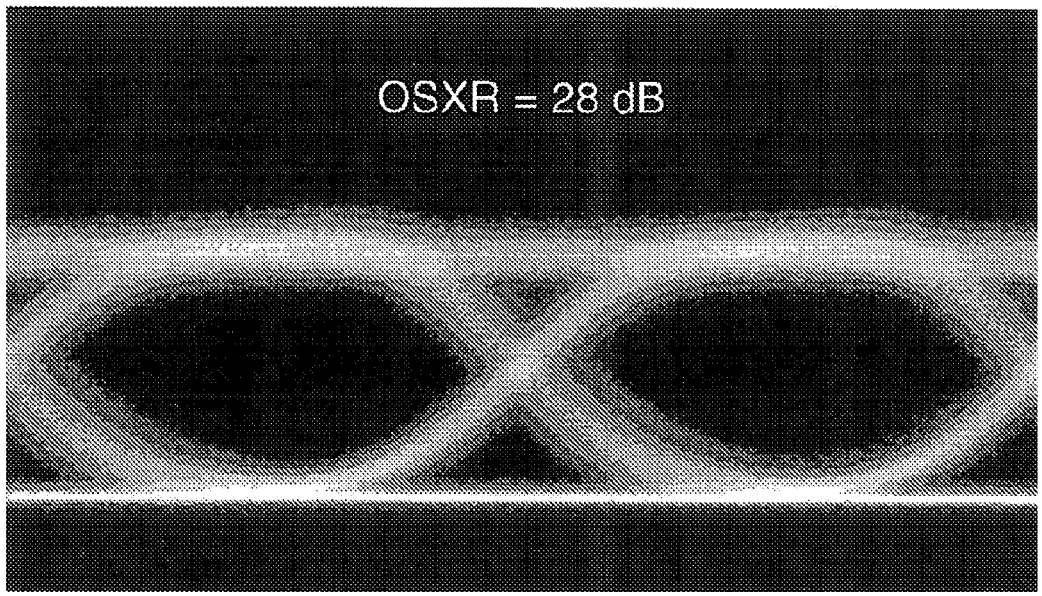
FIG. 5B shows a captured signal eye diagram for a digital optical signal in which cross-talk is present at a power level 28 dB lower than a desired power level.

In addition to tracking qualitative changes in an impairment in a digital optical signal, quantitative changes may also be measured using positive and negative value differential eye diagrams. For example, changes in the power level of coherent cross-talk can be determined. FIG. 5A depicts an baseline eye diagram 502 generated by sampling a digital optical signal in which coherent cross-talk is present at a power level that is 30 dB less than the power level of the desired signal, and FIG. 5B depicts a further eye diagram 504 generated by sampling a digital optical signal in which the power level of the coherent cross-talk is 28 dB less than the power level of the desired signal. Because the difference in the power levels of the coherent cross-talk is small, that is, only 2 dB, the two eye diagrams appear to be substantially identical.

Figure 6A:
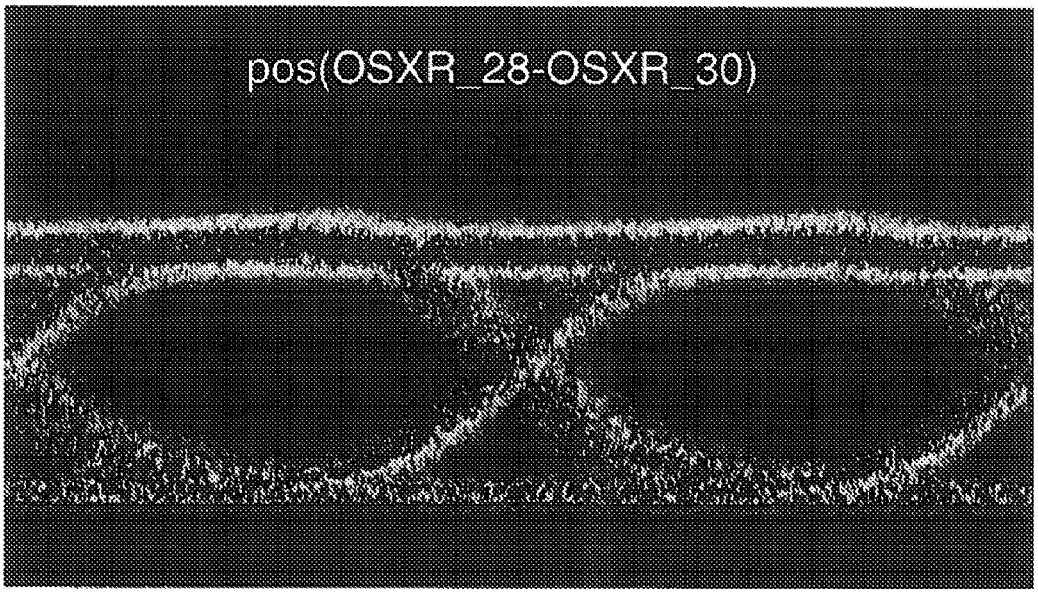
FIG. 6A shows a positive value differential eye diagram generated from the baseline signal eye diagram of FIG. 5A and the captured signal eye diagram of FIG. 5B.
Figure 6B:
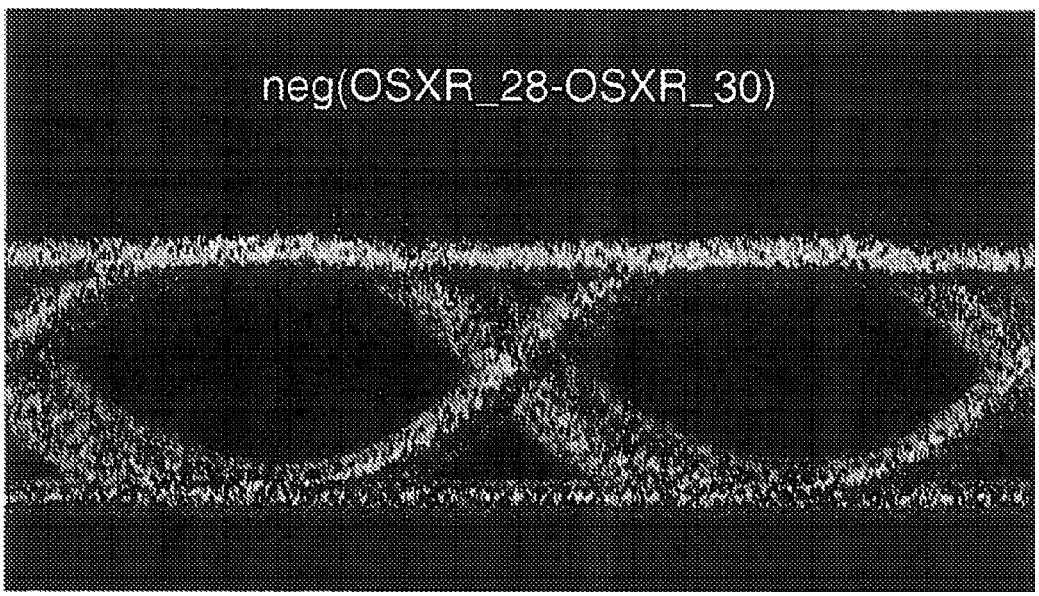
FIG. 6B shows a negative value differential eye diagram generated from the baseline signal eye diagram of FIG. 5A and the captured signal eye diagram of FIG. 5B.

FIG. 6A depicts a positive value differential eye diagram 602 and FIG. 6B depict a negative value differential eye diagram 604 that are respectively generated by subtracting the baseline signal eye diagram 502 from the further eye diagram 504. The positive differential eye diagram 602 and the negative value differential eye diagram 604 clearly differ and show the differences between the values represented by the pixels of the baseline eye diagram 502 and the values represented by the corresponding pixels of the further eye diagram 504. Thus, even small differences in the coherent cross-talk power level can be detected from the differential eye diagrams. If the samplings of the digital optical signal are periodically repeated and additional positive and negative value differential eye diagrams are produced for each such repetition, small changes in the coherent cross-talk power level can be tracked over time and used to determine whether corrective actions are required before performance of the optical transmission system is seriously impacted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of detecting changes in a digital optical signal, the method comprising:
   repeatedly sampling the digital optical signal in a synchronous manner during a predetermined interval to generate a captured eye diagram;
   generating at least one of a positive differential eye diagram or a negative differential eye diagram from the captured eye diagram and a baseline eye diagram, wherein the captured eye diagram and the baseline eye diagram each comprise a plurality of pixels, each pixel having an associated value, the generating step including:
      for each pixel in the baseline eye diagram, subtracting the value associated with the pixel in the baseline diagram from the value associated with a corresponding pixel in the captured eye diagram;
      wherein the positive eye diagram is generated from the pixels having positive difference values, and the negative eye diagram is generated from the pixels having negative difference values; and
   analyzing the at least one positive or negative differential eye diagram to determine whether a change in signal conditions is present, wherein the positive differential eye diagram shows regions to which the digital optical signal has spread since the baseline eye diagram was generated, and the negative differential eye diagram shows regions from which the digital optical signal has spread since the baseline eye diagram was generated.

2. The method of claim 1, wherein the sampled digital optical signal is an intensity modulated digital optical signal.

3. The method of claim 1, wherein the sampled digital optical signal is a phase modulated digital optical signal.

4. The method of claim 1, wherein the baseline eye diagram is generated by simulation.

5. The method of claim 1, further comprising: filtering and smoothing at least one of the captured eye diagram or the baseline eye diagram prior to the generating of the at least one positive or negative differential eye diagram.

\* \* \* \* \*

UNITED STATES PATENT AND TRADEMARK OFFICE
CERTIFICATE OF CORRECTION

PATENT NO. : 8,929,730 B2
APPLICATION NO. : 13/617078
DATED : January 6, 2015
INVENTOR(S) : Skoog et al.

Page 1 of 1

It is certified that error appears in the above-identified patent and that said Letters Patent is hereby corrected as shown below:

In the Specification

In Column 1, Lines 5-6, delete "of pending U.S. patent application Ser. No. 12/633,139, filed Dec. 8, 2009." and insert -- of U.S. patent application Ser. No. 12/633,139, filed Dec. 8, 2009 now Pat. No. 8364033. --, therefor.

In Column 1, Line 31, delete "dyhamic" and insert -- dynamic --, therefor.

Signed and Sealed this
Thirtieth Day of June, 2015

Michelle K. Lee
*Director of the United States Patent and Trademark Office*